May 19, 1925.                               1,538,529
N. Y. TROIDL
EDUCATIONAL APPLIANCE
Filed Feb. 23, 1922     2 Sheets-Sheet 1

INVENTOR.
Nellie York Troidl.
by Parker Brackwood
ATTORNEYS.

May 19, 1925.

N. Y. TROIDL 1,538,529

EDUCATIONAL APPLIANCE

Filed Feb. 23, 1922    2 Sheets-Sheet 2

INVENTOR.
Nellie York Troidl.
by Parker & Rochow.
ATTORNEYS.

Patented May 19, 1925.

1,538,529

UNITED STATES PATENT OFFICE.

NELLIE YORK TROIDL, OF NIAGARA FALLS, NEW YORK.

EDUCATIONAL APPLIANCE.

Application filed February 23, 1922. Serial No. 538,454.

*To all whom it may concern:*

Be it known that I, NELLIE YORK TROIDL, a citizen of the United States, residing at Niagara Falls, in the county of Niagara and State of New York, have invented a new and useful Improvement in Educational Appliances, of which the following is a specification.

This invention relates to educational appliances or cards for use in teaching or imparting knowledge to and entertaining young children, particularly in school work.

One object of the invention is to provide a set of cards whereby the instruction of young children in reading and other branches of education is facilitated, and at the same time the children are amused or entertained while they are being taught. A further object is to provide a set of cards each provided with one or more separable name or designating slips which are retained on the cards in such a way that the cards can be readily handled and manipulated in much the same manner as ordinary game cards, without danger of detaching the designating slips, while nevertheless the slips can be readily connected with and disconnected from the cards.

The appliance comprises a series or set of cards of any desired number, each bearing on one face thereof a picture of an object, and preferably also the name of said object, or other information, such for instance as number work, and each card is provided with a separable slip on which appears the name of the object pictured on the card, or other matter particularly related to the matter on the card, which slip is adapted to be engaged with the card so as to be retained thereon but removable therefrom. In the use of the cards for teaching reading, for example, by association of the names on the slips with the pictures on the cards, the name slips are detached from the cards and the cards and slips mixed indiscriminately, the problem for the child being to select and apply each name slip to its appropriate card, thereby learning to properly associate the related matter on the cards and slips, and thus learning to read the names. The cards are made of thin, stiff and durable material, such as the cardboard used for ordinary playing cards, and the name slips are preferably made of similar material.

The accompanying drawings illustrate two different embodiments of the invention. In said drawings.

Figure 1:
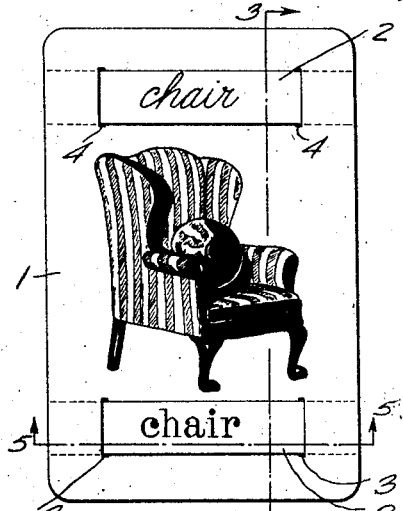
Figs. 1 and 2 represent face views of two cards bearing pictures and names of different objects, Fig. 1 showing two name slips in place on the card and Fig. 2 showing the slips partially removed.
Figure 2:
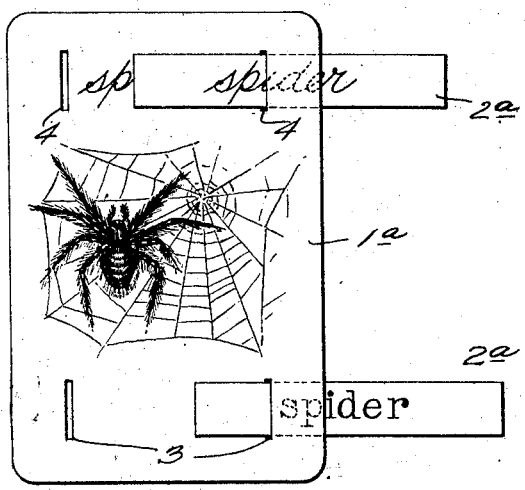
Figures 3, 4:
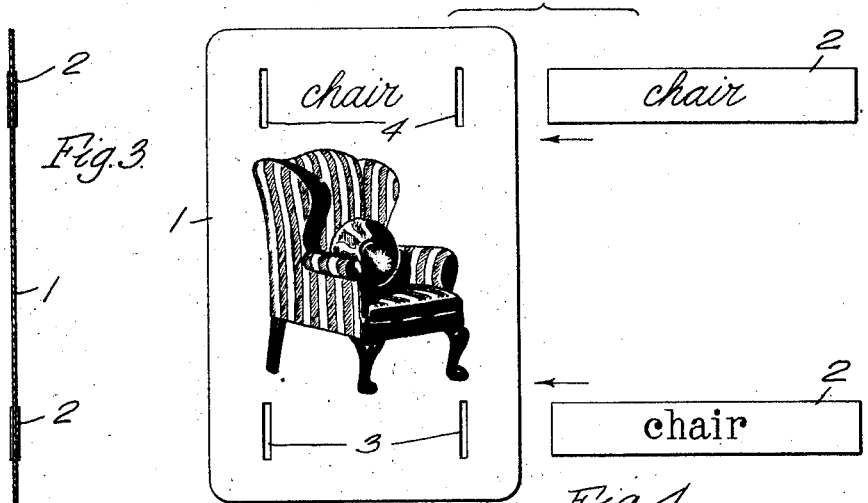
Fig. 3 is a section of one of the cards on line 3—3, Fig. 1.
Fig. 4 is a face view of the card shown in Fig. 1 and showing the name slips removed.

Referring first to the embodiment of the invention illustrated in Figs. 1 and 4.

1 and 1$^a$ represent two cards of a set or series, of which there may be any desired number, for instruction in reading, and 2 and 2$^a$ represent respectively the detachable or removable name slips for the cards 1 and 1$^a$. Each card has displayed thereon a picture of an object, the objects pictured on the several cards of the set being different. Each card also preferably has printed or otherwise displayed thereon the name of the object pictured on the card, this name being preferably, though not necessarily printed in script. For instance on the card 1 is a picture of a chair and above this the word "chair", and on the other card is a picture of a spider and the word "spider". The name slip for each card also has printed or otherwise displayed thereon the name of the object pictured on the face of the card, but on the slip the name is preferably printed in a different style of type so as to enable the child to become familiar with the name whether displayed in script or other style of printing.

Figure 5:
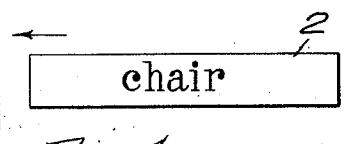
Fig. 5 is an enlarged transverse section of one of the cards on line 5—5, Fig. 1.
Figure 6:
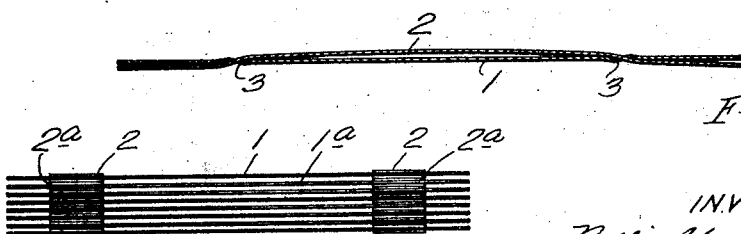
Fig. 6 is a longitudinal section of a stack of several of the cards.
Figure 7:
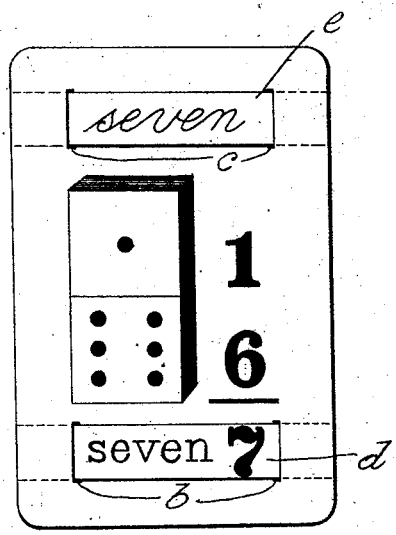
Figs. 7 and 8 are face views of two cards of a set for teaching addition and subtraction.
Figure 9:
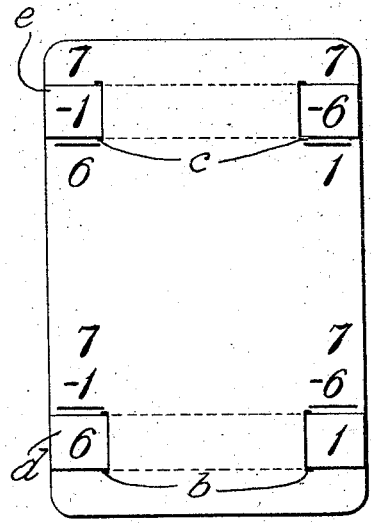
Figs. 9 and 10 show the reverse sides of the cards shown in Figs. 7 and 8 respectively.

For retaining the name slip on the card, the latter is preferably provided with two separated narrow slits $b$ so arranged that the ends of the name slip can be easily inserted through the slits as indicated in Figs. 1 and 5, thereby removably or detachably holding the slip in place on the card. In the preferred form of the invention, two of the name slips are provided for each card, the card being shown as provided at its lower portion with two slits $b$ for the reception of one name slip, and above the picture with two similar slits $c$ for the reception of the second name slip. When two slips are provided for each card, the name of the object pictured on the card appears on one slip in script or other style of type, and on the other slip in a different style of type.

In the use of the cards in a class room, each child is given a set or series of the cards with their companion name slips, the name slips being detached from the cards and mixed so that it is necessary for the child to select the appropriate name slip or slips for each card. The child is assisted in this by the fact that each card bears the same name that appears on the name slip or slips for that card. When the name slip for a card is found it is inserted in the slits in the card, the game or lesson being completed when the child has properly applied all of the name slips to the several cards of the set or series. Since all of the cards are of the same size and shape, and all of the slips are also alike in size and shape, the only guide for the child in applying the slips to their companion cards is by association of the names on the slips with the pictures or names on the cards, so that it is necessary for the child to recognize the names on the slips.

In shape and size the cards are preferably analogous to ordinary playing cards, so that the cards can be readily handled and stacked. This is so even when the name slips are in place on the cards, and the name slips will not readily become accidentally detached from the cards by handling or stacking the cards. Nevertheless the name slips can be easily connected with and detached from the cards when desired. By thus making the cards of thin cardboard or the like material, each set or series can consist of a relatively large number of cards, which, when stacked, will occupy only a small space and can therefore be readily handled even by quite young children. The cards when placed one upon another form a relatively low stack and are not apt to be disturbed and knocked over as would be the case with blocks or thick pieces stacked one upon another, and furthermore, the cards being made of light, thin material, can be handled or moved about upon the desk without noise or disturbance, which is important in teaching a class of children; and if the cards should be dropped, there would not be the noise and disturbance which would be caused by the use of wooden blocks or analogous, relatively heavy or cumbersome pieces. Another advantage in the use of the thin cards is that a number of sets or decks for the several children of a class can be stored in the minimum space.

The cards illustrated in Figs. 7–10 are for teaching addition and subtraction, each card of this set having on its front face numbers to be added and on its rear face corresponding numbers to be subtracted. When the removable slip is properly placed the numbers thereon answer or complete the problems, both on the front and reverse sides of the card. For instance, the card shown in Figs. 7 and 9 bears the numbers 1 and 6 on its front face and the removable slip $d$ at the bottom of this card bears on its front face the number 7, which is the sum of the numbers 1 and 6. On its rear face the slip $d$ has at its opposite ends the numbers 6 and 1, corresponding with the numbers on the front of the card. Appearing on the rear of the card above the ends of the slip are the examples in subtraction 7 less 1 and 7 less 6, the answers to which are the numbers 6 and 1 respectively, each of which appears below its appropriate example. On the rear face of the second slip $e$ for the card are the numbers minus 1 (−1) and minus 6 (−6), which cooperate with adjacent numbers on the rear face of the card to produce the examples in subtraction 7−1=6 and 7−6=1. It will be seen that as there are always a certain number of combinations making any given number as, for example, those making 7 are:

$$\begin{array}{cccccc} 1 & 2 & 3 & 4 & 5 & 6 \\ +6 & +5 & +4 & +3 & +2 & +1 \\ \hline 7 & 7 & 7 & 7 & 7 & 7 \end{array}$$

there will be a like number of slips bearing on the front side "Seven 7" and an equal number of slips bearing on the front side the word "Seven" in script. However, on the reverse side there are no two slips alike, due to the use of the different numbers, which combined make seven, or if the numbers are the same, the arrangement is different. The slips therefore cannot be interchanged on the cards if the problems are correctly answered or completed both in addition on the front side and subtraction on the reverse side of the card. In addition to the numbers, the card preferably has pictured on its front face a domino with dots corresponding to the numbers on the card and the removable slips bear the word "Seven" in different styles of type, as an aid to the child in applying the slips to the card, and also to familiarize him with the written and printed forms of the word "Seven."

Figure 8:
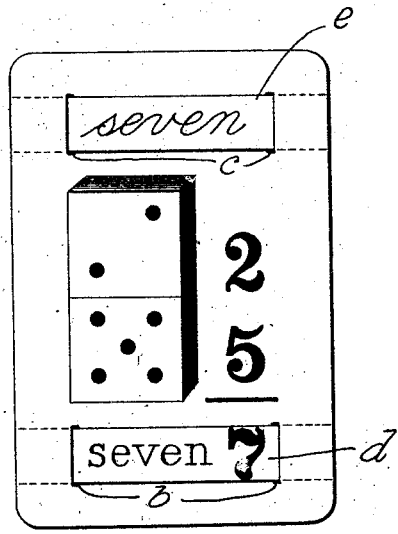
Figure 10:
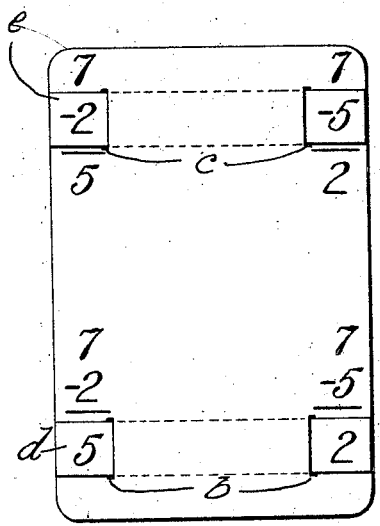

Figs. 8 and 10 show the front and reverse sides of another card of the set for number work, this card showing similar combinations of the numbers 2, 5 and 7. Any number of the cards necessary to make a desired numerically complete set of combinations can be provided.

The invention is not restricted to the specific embodiments thereof herein illustrated for exemplifying the invention, but these should suffice to indicate that the cards and slips constructed and associated as explained are susceptible for use in imparting knowledge in various different subjects.

I claim as my invention:

1. In an educational appliance, a card, a slip removably retained on said card with portions of said slip exposed at opposite sides of the card, said card bearing on opposite faces thereof different representations, and said slip bearing on the portion thereof exposed at the front side of the card a designation of the representation on the front face of the card, and bearing on the portion thereof exposed at the reverse side of the card a designation of the different representation on said reverse side of the card.

2. In an educational appliance, a series of cards, and a corresponding series of slips, each of said cards and its companion slip being constructed to removably retain said slip on the card with portions of said slip exposed at opposite sides of the card, each of said cards bearing on opposite faces thereof different combinations of numbers, the combinations on different cards being different, and each of said slips bearing on the portion thereof exposed at each side of its companion card a number coordinated with the numbers on the corresponding face of the card.

3. In an educational appliance, a series of cards, and a corresponding series of slips, each of said cards and its companion slip being constructed to removably retain said slip on the card with portions of said slip exposed at opposite sides of the card, each of said cards bearing on opposite faces thereof different combinations of numbers, the combinations on different cards being different, and each of said slips bearing on the portion thereof exposed at each side of its companion card a number coordinated with the numbers on the corresponding face of the card, so that when the removable slip is properly placed the numbers thereon either answer or complete the problems both on the front and reverse sides of the cards.

4. In an educational appliance, a series of thin flexible cards each bearing a different representation, and a plurality of thin flexible designating slips for each card, said slips bearing in different types designations of the representations on the respective cards to which they belong, each card being provided with integral portions with which the respective designation slips engage for retaining the slips in place on the cards, whereby when the designating slips are assembled on proper cards the representation on each card is coupled with a plurality of designations thereof in different type.

5. In an educational appliance, a series of cards and a corresponding series of slips, each of said cards and its companion slip being constructed to removably retain said slips on the card with portions of said slip exposed at opposite sides of the card, each of said cards bearing on opposite faces thereof different combinations of numbers, the combinations on different cards being different, and each of said slips bearing on the portion thereof exposed at one side of its companion card a number which is the sum of the numbers on that side of the card and bearing on the portion exposed at the opposite side of its companion card a number which is the difference between the numbers displayed on that side of the companion card.

NELLIE YORK TROIDL.